United States Patent
Shinn et al.

(10) Patent No.: US 7,447,675 B2
(45) Date of Patent: Nov. 4, 2008

(54) SYSTEMS AND METHODS FOR CURSORED COLLECTIONS

(75) Inventors: Matthew Shinn, San Francisco, CA (US); Seth White, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 307 days.

(21) Appl. No.: 10/365,907

(22) Filed: Feb. 13, 2003

(65) Prior Publication Data

US 2004/0002965 A1 Jan. 1, 2004

Related U.S. Application Data

(60) Provisional application No. 60/358,655, filed on Feb. 21, 2002.

(51) Int. Cl.
*G06F 17/30* (2006.01)
(52) U.S. Cl. .............. 707/3; 707/10; 707/102; 707/103 Y; 717/118
(58) Field of Classification Search .......... 707/3, 707/10, 102, 104, 1, 103 Y; 717/118
See application file for complete search history.

(56) References Cited

U.S. PATENT DOCUMENTS

| | | | |
|---|---|---|---|
| 5,499,371 A | | 3/1996 | Henninger et al. |
| 6,085,198 A * | | 7/2000 | Skinner et al. .......... 707/103 R |
| 6,199,195 B1 * | | 3/2001 | Goodwin et al. ............ 717/104 |
| 6,266,666 B1 | | 7/2001 | Ireland et al. |
| 6,442,541 B1 * | | 8/2002 | Clark et al. ................. 707/3 |
| 6,453,321 B1 * | | 9/2002 | Hill et al. ............... 707/103 Y |
| 6,466,933 B1 | | 10/2002 | Huang et al. |
| 6,505,200 B1 | | 1/2003 | Ims et al. |
| 6,539,396 B1 * | | 3/2003 | Bowman-Amuah ..... 707/103 R |
| 6,571,282 B1 * | | 5/2003 | Bowman-Amuah ......... 709/219 |
| 6,591,272 B1 * | | 7/2003 | Williams .................. 707/102 |

(Continued)

FOREIGN PATENT DOCUMENTS

GB 2339036 A 1/2000

OTHER PUBLICATIONS

Richard Monson-Haefel, Read all about EJB 2.0, Jun. 2000, JavaWorld.*

(Continued)

*Primary Examiner*—Shahid A Alam
(74) *Attorney, Agent, or Firm*—Fliesler Meyer LLP

(57) ABSTRACT

A cursored collection can be used to allow a user to view subsets of a data result set, thereby conserving system resources. A persistence manager can execute SQL statements on a database, receive a result set from the database, and populate a set of EJBs with the result set. This can be a full result set, or a subset of the full result set. A bean manager can allow the user to access all the EJBs or a subset of the EJBs. The bean manager can also provide the user with a list of EJBs and let the client select the EJBs to access. The client can then iterate through the result set, either by viewing different subsets or selecting different EJBs from the list. This iterative process can continue until all the results have been viewed or the client does not wish to access any more results from the set.

19 Claims, 2 Drawing Sheets

U.S. PATENT DOCUMENTS

| | | | |
|---|---|---|---|
| 6,640,244 B1 * | 10/2003 | Bowman-Amuah | 709/207 |
| 6,694,328 B1 | 2/2004 | Bennett | |
| 6,760,719 B1 | 7/2004 | Hanson et al. | |
| 6,823,329 B2 | 11/2004 | Kirk et al. | |
| 6,836,889 B1 | 12/2004 | Chan et al. | |
| 6,971,085 B1 | 11/2005 | Alcorn | |
| 6,985,912 B2 | 1/2006 | Mullins et al. | |
| 6,996,565 B2 | 2/2006 | Skufca et al. | |
| 2002/0042789 A1 * | 4/2002 | Michalewicz et al. | 707/3 |
| 2003/0014552 A1 * | 1/2003 | Vaitheeswaran et al. | 709/312 |
| 2003/0050932 A1 * | 3/2003 | Pace et al. | 707/100 |

OTHER PUBLICATIONS

U.S. Appl. No. 60/349,432, filed Jan. 18, 2002, Matthew Shinn.

Cecchet et al., "Performance and Scalability of EJB Applications" Proceedings of the 17th ACM Conference on Object-Oriented Programming, Systems, Languages and Applications. Nov. 2002. vol. 37, Issue 11. ACM Press. pp. 246-250, especially pp. 247-248.

* cited by examiner

SYSTEMS AND METHODS FOR CURSORED COLLECTIONS

CLAIM OF PRIORITY

This application claims priority to U.S. Provisional Patent Application No. 60/358,655, filed Feb. 21, 2002, entitled "SYSTEM AND METHOD FOR CURSORED COLLECTIONS," which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference: U.S. Provisional Application No. 60/349,432 entitled "System and Method for Dynamic Queries," by Matthew Shinn et al., filed Jan. 18, 2002.

FIELD OF THE INVENTION

The present invention relates to the execution of queries against a database.

BACKGROUND

The Enterprise JavaBean (EJB) specification from Sun Microsystems, Inc. of Palo Alto, Calif., defines a way to do multi-platform transaction processing in Java. The EJB spec utilizes containers in which transaction-oriented applications can be written. The EJB architecture includes several elements, including session beans that control work flow and client interaction, as well as entity beans that interact with external resources such as databases and other enterprise servers. Entity beans can represent data elements, such as database elements that are represented to an application.

Access is gained to an EJB through a Home interface, using an EJB server and relevant EJB container. The EJB container provides access to an entity bean under "managed persistence," whereby the entity bean does not need to be loaded into memory. The loading is done by the container through Container Managed Persistence (CMP), or by the entity bean itself using Bean Managed Persistence (BMP). Each entity bean can provide at least one finder method, which provides a user with a way to look up the bean when needed.

The EJB specification describes ways to execute queries against a database, as well as ways for a user to communicate queries to an EJB container. A user develops a query before deploying an EJB. Once the EJB is deployed, the user can execute the query. When executing a query, the component executing the query will iterate through all the results of the query. These results will then be used to populate other EJBs. All these EJBs are then handed back to the user in one big collection. This can waste system resources unnecessarily, as a user may only be interested in certain results and does not need to be sent the entire result set.

BRIEF SUMMARY

Systems and methods in accordance with one embodiment of the present invention can overcome these and other deficiencies of the prior art. A client can generate a query request using a finder method and sending the query request to a Home interface in an EJB container. The Home interface can do a security check, then contact the relevant bean manager. The bean manager can pass the query request in a call to a persistence manager. The persistence manager can receive the request and generate the appropriate SQL for the query. The persistence manager can execute the SQL query on the database and receive back a result set from the database.

The persistence manager can populate a set of EJBs with the result set. This can be a full result set, or a subset of the full result set. A bean manager is able to provide the client with access to any populated EJBs, which can be stored in local cache. The bean manager can allow the user to access all the EJBs or a subset of the EJBs. The bean manager can also provide the user with a list of EJBs and let the client select the EJBs to access. The client can iterate through the result set, either by viewing different subsets or selecting different EJBs from the list. This iterative process can continue until all the results have been viewed or the client does not wish to access any more results.

Other features, aspects, and objects of the invention can be obtained from a review of the specification, the figures, and the claims.

DETAILED DESCRIPTION

Figure 1:
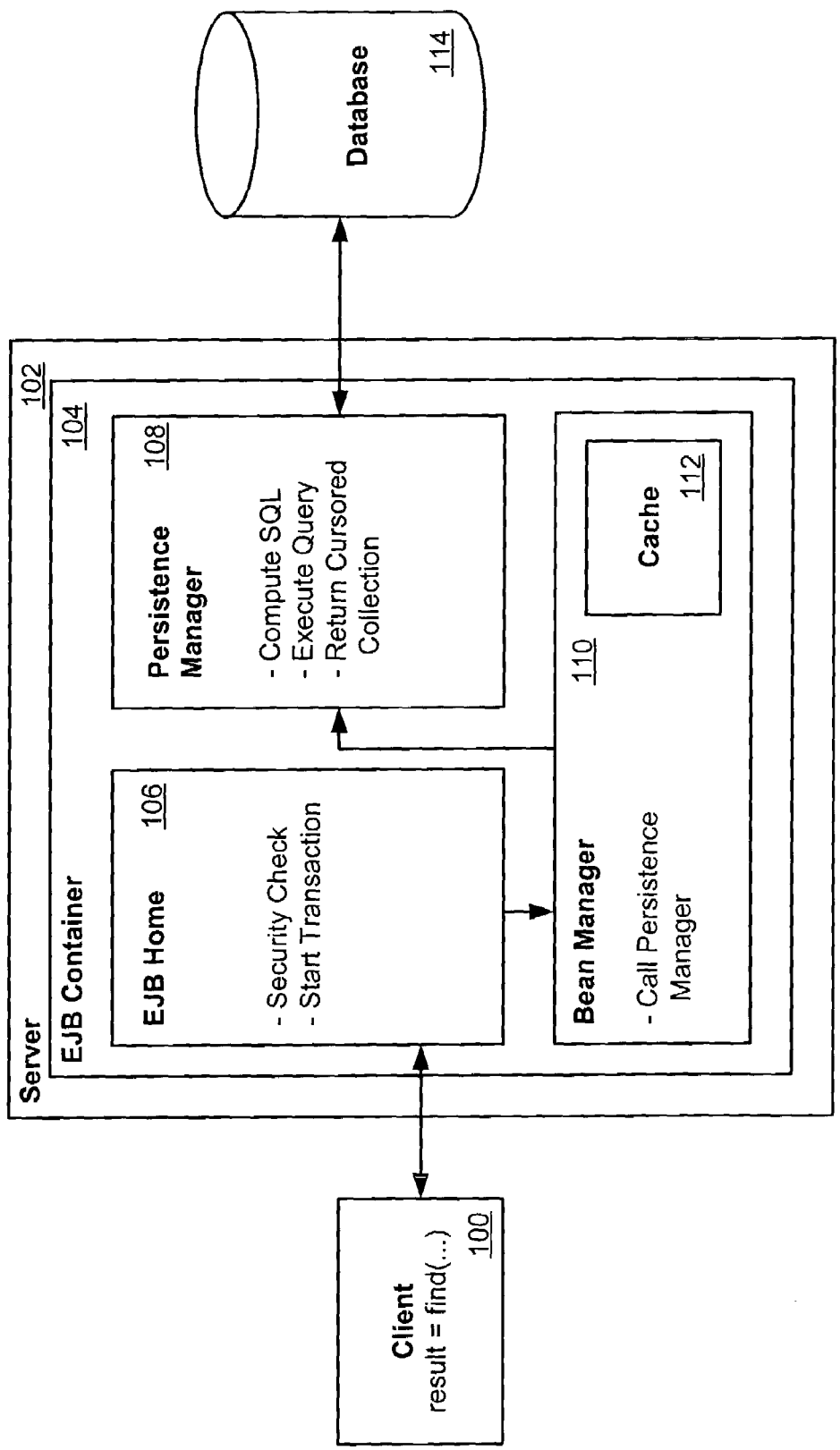
FIG. 1 is a diagram of a system in accordance with one embodiment of the present invention.

Systems and methods in accordance with one embodiment of the present invention change how results of a query are handled. Such a system can iterate through only those results for which a user asks, instead of every result matching the query. A user can execute a finder method, and the system will give the user back a cursored collection. A cursored collection allows a user to have the finder results processed on an as-needed, or as-requested, basis. Previously, all finder results were processed in batch before control was passed back to the user. In some situations, this can result in unnecessary work being done, costing the user both time and CPU cycles. With cursored collections, users can choose how finder results are processed.

A "cursored" collection can be thought of as a collection that keeps a pointer at the present location of the user in the collection of query results. This pointer can be maintained by the database or a persistence manager, for example. In one embodiment, the system gets the data from the database at each step as the user iterates through the collection. In another embodiment, the system stores all the results of the query in local cache and sends only those results to the user that correspond to the current iteration. These approaches can avoid the wasting of resources associated with pulling all the results and sending them to the user, since the user might only be interested in the first five results, for example.

If a user executes a query that generates 100 results, for example, 100 EJBs can each be populated with one of those results. In one embodiment, a user is shown a list of the results, and is allowed to choose which results the user wishes to receive. In another embodiment, the user could be send 20 results at a time. If the user gets the result being sought, there is no need to send the remaining 80 results.

Cursored collections can be implemented with a simple API. There may be no impact on users unless they opt to make use of this feature. To enable the use of cursored collections, users can simply add an element to a relevant CMP deployment descriptor. This element can be as follows:

<!ELEMENT return-cursored-collection (#PCDATA)>

This return-cursored-collection element can be a sub-element of a query function, such that it can be specified on a per-method basis. The value of the return-cursored-collection element can be either 'True' or 'False'. Cursored collections may only be available for finders on the local Home interface, as cursored collections are not serializable in some embodiments.

In addition to adding an element such as a return-cursored-collection element to the deployment descriptor, a cursored collection interface can be created to provide the user with a method that can be used to close the underlying result set. It may be imperative that the user invokes this method when they are finished with the cursored collection to release the database, as well as any associated JDBC resources.

Currently, when multi-object finders return a collection of primary keys, EJB objects are materialized for each primary key. This is not necessary, however, unless each of the EJBs will be invoked. If it is reasonably certain that not all finder results will be used, it may be more efficient to create the EJB objects as they are needed. The efficiency can be further improved when an option such as finders-load-bean is enabled, in which case the EJB objects are created and their fields are loaded into cache.

A cursored collection interface to external entities, such as Javadocs, MBeans, Objects, and classes, can be implemented as:

```
public final interface CursoredCollection extends Collection {
    public void close( ) throws SQLException;
}
```

The application can make use of this interface as follows:

```
InitialContext Ic = new InitialContext( );
EmployeeHome eh = (EmployeeHome)ic.lookup("employeeHome");
Collection results = eh.findByName("John");
Iterator it = results.iterator( );
while (it.hasNext( ) && ...) {
    ...
}
((CursoredCollection)results).close( );
```

FIG. 1 shows the execution path for a cursored collection system in accordance with one embodiment of the present invention. A client 100 can execute a finder method that is directed to an EJB Home interface 106 in an EJB container 104 on a server 102 in communication with the database 114. The Home interface 106 can execute a security check and can start the transaction by contacting the relevant bean manager 110. The bean manager 110 can in turn contact the persistence manager 108 for CMP. The persistence manager can compute the relevant SQL statements for the query and can execute the query against the database 114. The persistence manager 108 can then take the results from the database query and return a cursored collection to the bean manager 110.

Figure 2:
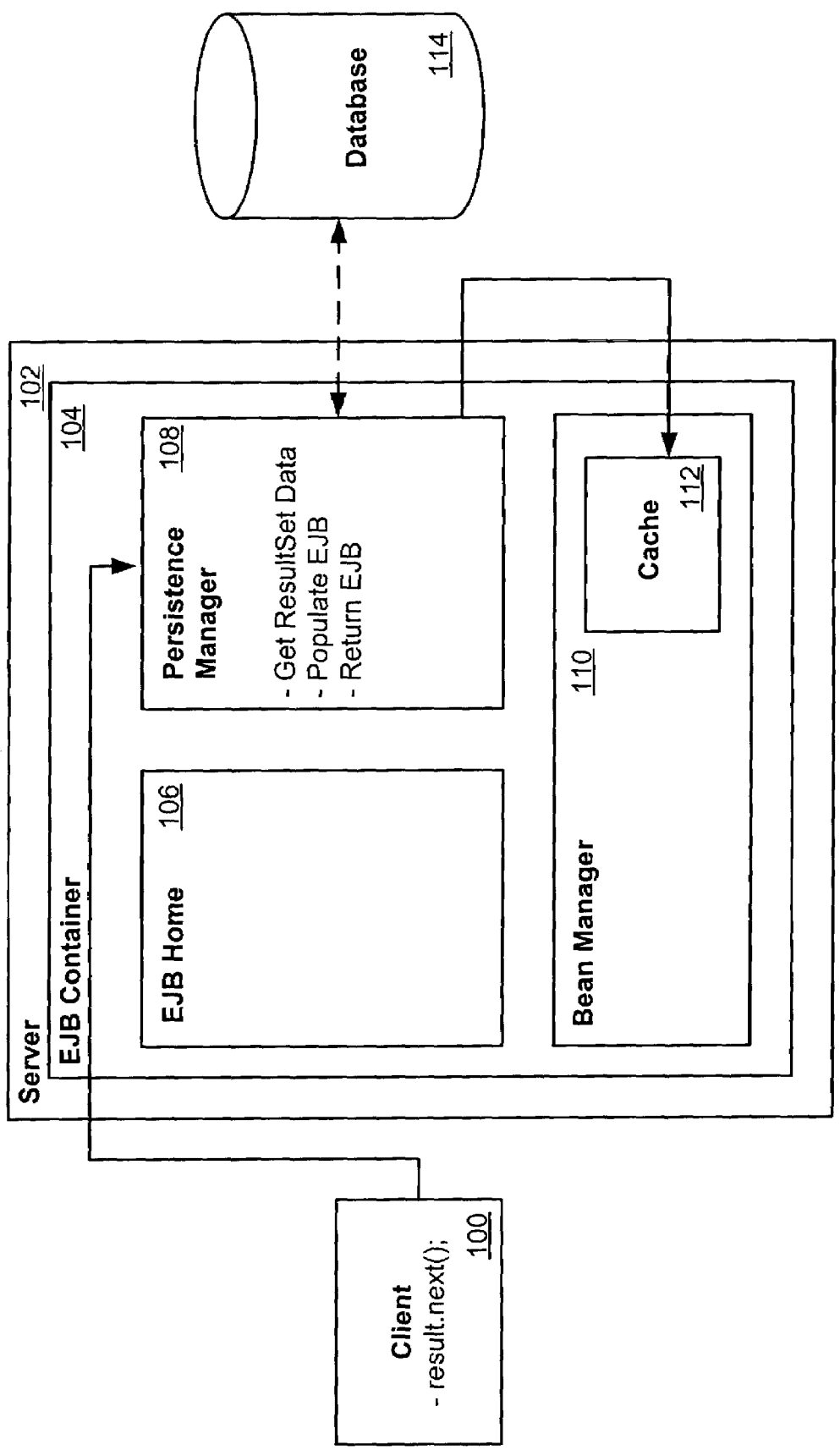
FIG. 2 is another diagram of the system of FIG. 1.

The persistence manager 108 can return a list of results from which the client 100 can choose, or can return a certain subset of results for each iteration through the result set. As shown in FIG. 2, the 'ResultSet' data can be obtained from the database 114 by the persistence manager 108, which can populate one EJB for each result returned, and can return each EJB to the client 100. The EJBs can be stored in local cache 112 for the relevant bean manager 110. The client 100 can then execute a result.next( ) method to step through the results and go through the next iteration. This iterative process can continue until the client views all the query results or does not wish to view any more of the results.

Methods of the present invention can be implemented on a computer-readable medium, a computer program product, computer system and/or computer data signal embodiment in transmission medium.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer-based system for allowing a client to execute a query against a database, comprising:
   a persistence manager to receive a query request from a client and generate SQL for the query, the persistence manager further to execute the SQL on a database and receive a result set from the database, the persistence manager populating a set of EJBs with results of the result set wherein multiple EJBs are thus filed with the results of a single query into the database; and
   a bean manager to provide the client with access to one of the set of EJBs;
   wherein the EJBs are stored as a cursored collection that allows a client to execute a "next result" method to step through the EJBs, each EJB containing a single result, the bean manager storing the set of EJBs in local cache;
   wherein the computer based system includes at least one processor.

2. A system according to claim 1, further comprising a home interface to receive the query request from the client and contact the bean manager.

3. A system according to claim 2, wherein said home interface executes a security check before contacting the bean manager.

4. A system according to claim 1, wherein said persistence manager populates the set of EJBs with a subset of the result set for each of a number of iterations through the result set.

5. A system according to claim 1, further comprising a finder method for execution by the client, the finder method generating the query request.

6. A system according to claim 1, wherein said bean manager provides the client with a list of EJBs in local cache, said bean manager allowing the client to select EJBs from the list to which the user wants access.

7. A method for allowing a client to execute queries against a database, comprising:
   executing a finder method to generate a query to be executed against a database;

generating the SQL for the query and executing the query against the database;

receiving a set of results from the database corresponding to the query, and populating a set of EJBs with the results wherein multiple EJBs are thus filed with the results of a single query into the database;

allowing the client to access the set of EJBs;

wherein the EJBs are stored as a cursored collection that allows a client to execute a "next result" method to step through the EJBs, each EJB containing a single result;

wherein a persistence manager is adapted to receive a query request from the client and generate SQL for the query;

wherein the persistence manager executes the SQL on the database; and wherein the persistence manger populates the set of EJBs.

8. A method according to claim 7, further comprising: selecting a new subset of results and populating a new set of EJBs with the new subset of results.

9. A method according to claim 7, further comprising: storing the set of EJBs in local cache.

10. A method for allowing a client to execute queries against a database, comprising:

executing a finder method to generate a query to be executed against a database;

generating the SQL for the query and executing the query against the database;

receiving a set of results from the database corresponding to the query and populating a set of EJBs with the results of a single query into the database;

allowing the client to access a subset of the EJBs;

wherein the EJBs are stored as a cursored collection that allows a client to execute a "next result" method to step through the EJBs, each EJB containing a single result;

wherein a persistence manager is adapted to receive a query request from the client and generate SQL for the query;

wherein the persistence manager executes the SQL on the database; and wherein the persistence manger populates the set of EJBs.

11. A method according to claim 10, further comprising: allowing the client to access another subset of the EJBs.

12. A method according to claim 10, further comprising: storing the set of EJBs in local cache.

13. A computer-readable storage medium, comprising:

means for executing a finder method to generate a query to be executed against a database;

means for generating the SQL for the query and executing the query against the database;

means for receiving a set of results from the database corresponding to the query and populating a set of EJBs with the results of a single query into the database;

means for allowing the client to access the EJBs;

wherein the EJBs are stored as a cursored collection that allows a client to execute a "next result" method to step through the EJBs, each EJB containing a single result;

wherein a persistence manager is adapted to receive a query request from the client and generate SQL for the query;

wherein the persistence manager executes the SQL on the database; and wherein the persistence manger populates the set of EJBs.

14. A computer program product on a computer-readable storage medium for execution by a server computer for allowing a client to execute queries against a database, comprising:

computer code for executing a finder method to generate a query to be executed against a database;

computer code for generating the SQL for the query and executing the query against the database;

computer code for receiving a set of results from the database corresponding to the query and populating a set of EJBs with the results of a single query into the database;

computer code for allowing the client to access a subset of the EJBs;

wherein the EJBs are stored as a cursored collection that allows a client to execute a "next result" method to step through the EJBs, each EJB containing a single result;

wherein a persistence manager is adapted to receive a query request from the client and generate SQL for the query;

wherein the persistence manager executes the SQL on the database; and wherein the persistence manger populates the set of EJBs.

15. A computer-based system for allowing a client to execute queries against a database, comprising:

means for executing a finder method to generate a query to be executed against a database;

means for generating the SQL for the query and executing the query against the database;

means for receiving a set of results from the database corresponding to the query and populating a set of EJBs with the results of a single query into the database;

means for allowing the client to access the EJBs;

wherein the EJBs are stored as a cursored collection that allows a client to execute a "next result" method to step through the EJBs, each EJB containing a single result;

wherein the computer based system includes at least one processor;

wherein a persistence manager is adapted to receive a query request from the client and generate SQL for the query;

wherein the persistence manager executes the SQL on the database; and wherein the persistence manger populates the set of EJBs.

16. A computer system comprising: a processor;

object code executed by said processor, said object code configured to:

execute a finder method to generate a query to be executed against a database;

generate the SQL for the query and executing the query against the database;

receive a set of results from the database corresponding to the query and populating a set of EJBs with the results wherein multiple EJBs are thus filed with the results of a single query into the database;

allow clients to access the EJBs;

wherein the EJBs are stored as a cursored collection that allows a client to execute a "next result" method to step through the EJBs, each EJB containing a single result;

wherein a persistence manager is adapted to receive a query request from the client and generate SQL for the query;

wherein the persistence manager executes the SQL on the database; and wherein the persistence manger populates the set of EJBs.

17. A computer-readable storage medium, comprising:

a code segment including instructions to execute a finder method to generate a query to be executed against a database;

a code segment including instructions to generate the SQL for the query and executing the query against the database;

a code segment including instructions to receive a set of results from the database corresponding to the query and populating a set of EJBs with the results of a single query into the database;

a code segment including instructions to allow the client to access the EJBs;

wherein the EJBs are stored as a cursored collection that allows a client to execute a "next result" method to step through the EJBs, each EJB containing a single result;

wherein a persistence manager is adapted to receive a query request from the client and generate SQL for the query;

wherein the persistence manager executes the SQL on the database; and wherein the persistence manger populates the set of EJBs.

18. A computer-based method comprising:

generating SQL for a query and executing the query against a database;

receiving a set of results from the database corresponding to the query and populating a set of EJBs with single results of the set of results, such that each EJB of the set contains a different result wherein multiple EJBs are thus filed with the results of a single query into the database;

wherein the EJBs are stored as a cursored collection that allows a client to execute a "next result" method to step through the EJBs, each EJB containing a single result;

wherein a persistence manager is adapted to receive a query request from the client and generate SQL for the query;

wherein the persistence manager executes the SQL on the database; and wherein the persistence manger populates the set of EJBs.

19. The method of claim 18, further comprising populating another EJB with the set of results.

* * * * *